(12) United States Patent
Nozawa

(10) Patent No.: US 10,195,959 B2
(45) Date of Patent: Feb. 5, 2019

(54) VEHICLE POWER CONTROL

(71) Applicant: TOYOTA JIDOSHA KABUSHIKI KAISHA, Toyota-shi, Aichi-ken (JP)

(72) Inventor: Takashi Nozawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/726,601

(22) Filed: Oct. 6, 2017

(65) Prior Publication Data
US 2018/0126866 A1 May 10, 2018

(30) Foreign Application Priority Data
Nov. 10, 2016 (JP) .................. 2016-219885

(51) Int. Cl.
*B60L 3/00* (2006.01)
*B60L 11/18* (2006.01)
*H02M 3/335* (2006.01)
*B60L 11/00* (2006.01)
*B60L 1/00* (2006.01)

(52) U.S. Cl.
CPC ............ *B60L 11/1896* (2013.01); *B60L 1/00* (2013.01); *B60L 3/0038* (2013.01); *B60L 3/0046* (2013.01); *B60L 3/0053* (2013.01); *B60L 3/0069* (2013.01); *B60L 3/0084* (2013.01); *B60L 11/005* (2013.01); *H02M 3/33507* (2013.01); *H02M 3/33584* (2013.01); *B60L 2210/12* (2013.01); *B60L 2210/14* (2013.01)

(58) Field of Classification Search
CPC ...... B60L 3/003; B60L 3/0069; B60L 3/0084; B60L 3/04; B60L 11/1868; B60L 11/1896; H02M 3/33507; H02M 3/33584
See application file for complete search history.

(56) References Cited

U.S. PATENT DOCUMENTS

| | | | | |
|---|---|---|---|---|
| 4,508,999 A | * | 4/1985 | Melocik ................ | B60L 3/0069 388/811 |
| 5,488,283 A | * | 1/1996 | Dougherty .......... | B60L 11/1855 307/10.1 |
| 6,023,137 A | * | 2/2000 | Kumar .................. | B60L 11/123 123/352 |

(Continued)

FOREIGN PATENT DOCUMENTS

| | | |
|---|---|---|
| JP | 2010-78093 | 4/2010 |
| JP | 2012-249384 A | 12/2012 |

(Continued)

*Primary Examiner* — Frank B Vanaman
(74) *Attorney, Agent, or Firm* — Finnegan, Henderson, Farabow, Garrett & Dunner, LLP

(57) ABSTRACT

A vehicle includes a system main relay, a first voltage converter, a second voltage converter, a first diode disposed in a third power line and configured to prevent a reverse flow of a current from the first auxiliary machine to the auxiliary machine battery, and a second diode disposed in a second power line and configured to prevent a reverse flow of a current from the first auxiliary machine to the second voltage converter. Therefore, according to the vehicle, even when the auxiliary machine battery is short-circuited, the first diode can prevent a reverse flow of a current and the second voltage converter can continuously supply electric power to the first auxiliary machine.

4 Claims, 4 Drawing Sheets

(56) References Cited

U.S. PATENT DOCUMENTS

| | | | |
|---|---|---|---|
| 2003/0107352 A1* | 6/2003 | Downer | B60L 11/123 322/40 |
| 2009/0066163 A1* | 3/2009 | Gallegos-Lopez | B60L 11/1868 307/86 |
| 2009/0067202 A1* | 3/2009 | Ichikawa | B60L 11/1868 363/79 |
| 2010/0060080 A1* | 3/2010 | Sawada | B60K 6/365 307/48 |
| 2013/0069425 A1* | 3/2013 | Kanazawa | B60L 11/1816 307/9.1 |
| 2013/0106320 A1* | 5/2013 | Yugo | H02P 7/00 318/139 |
| 2015/0229218 A1* | 8/2015 | Hosoda | H02M 3/33507 363/21.01 |
| 2016/0090052 A1 | 3/2016 | Nishijima et al. | |
| 2016/0144725 A1 | 5/2016 | Nozawa | |

FOREIGN PATENT DOCUMENTS

| | | |
|---|---|---|
| JP | 2013-99134 | 5/2013 |
| JP | 2016-101057 | 5/2016 |
| WO | WO2015-104750 A1 | 7/2015 |

\* cited by examiner

VEHICLE POWER CONTROL

INCORPORATION BY REFERENCE

The disclosure of Japanese Patent Application No. 2016-219885 filed on Nov. 10, 2016 including the specification, drawings and abstract is incorporated herein by reference.

BACKGROUND

1. Technical Field

The present disclosure relates to a vehicle. A vehicle in the present disclosure includes a hybrid vehicle including both a motor and an engine and a vehicle including a fuel cell as a main battery for a motor.

2. Description of Related Art

An electric vehicle travels by driving a motor using electric power of a main battery. Japanese Patent Application Publication No, 2010-078093 (JP 2010-078093 A), Japanese Patent Application Publication No. 2013-099134 (JP 2013-099134 A), and Japanese Patent Application Publication No. 2016-101057 (JP 2016-101057 A) disclose examples of an electric vehicle. A hybrid vehicle travels with a driving torque of at least one of a motor and an engine. The electric vehicle includes a group of various low-voltage devices that operate with a voltage lower than an output voltage of a main battery (that is, driving power of a motor for traveling). Such a low-voltage device group is referred to as auxiliary machines. The electric vehicle includes an auxiliary machine battery in addition to the main battery, and an output voltage of the auxiliary machine battery is the same as a driving voltage of the auxiliary machines. The electric vehicle further includes a voltage converter that steps down a voltage of the main battery and supplies the stepped-down voltage to the auxiliary machine battery.

The auxiliary machines can be classified into critical devices involved in a driving system of a vehicle and devices not involved in the driving system. Examples of the critical devices include a shift-by-wire device, and examples of the devices not involved in the driving system include an audio device. It is preferable that an electric vehicle include backup means of the auxiliary machine battery so that supply of power to the critical devices involved in the driving system is not stopped when the auxiliary machine battery is out of order. In the electric vehicle disclosed in JP 2010-078093 A, when the auxiliary machine battery is out of order, a voltage of the main battery is stepped down by a voltage converter and the stepped-down voltage is supplied to critical auxiliary machines. That is, the main battery and the voltage converter serve as power backup means for the critical auxiliary machines. The electric vehicle disclosed in JP 2013-099134 A includes a secondary battery such as a lithium ion battery and a capacitor as a backup power supply.

In general, an electric vehicle includes a system main relay between a main battery and a power converter. The power converter converts output power of the main battery into driving power of a motor. The system main relay electrically connects or disconnects the main battery and the power converter. When a main switch of a vehicle is turned off, the system main relay isolates the main battery and the power converter from each other. When the main switch of the vehicle is turned on, the system main relay connects the main battery and the power converter to each other and thus the vehicle can travel. The electric vehicle disclosed in JP 2016-101057 A includes two voltage converters that step down an output voltage of the main battery to a voltage of the auxiliary machine battery. The first voltage converter is connected to the auxiliary machine battery via the system main relay, and the second voltage converter is connected to the auxiliary machine battery without passing through the system main relay. When the first voltage converter is unavailable, the auxiliary machine battery is charged using the second voltage converter. When the second voltage converter is unavailable, the auxiliary machine battery is charged using the first voltage converter. The second voltage converter corresponds to the power backup means for the auxiliary machines.

SUMMARY

In the techniques disclosed in JP 2010-078093 A, JP 2013-099134 A, and JP 2016-101057 A, the auxiliary machine battery which is out of order can be isolated from the auxiliary machines, but when the auxiliary machine battery is short-circuited, a power input terminal of a critical auxiliary machine is maintained at zero volts and thus electric power cannot be supplied from power backup means for the auxiliary machines.

The disclosure enables power to be continuously supplied to critical auxiliary machines even when an auxiliary machine battery is short-circuited.

One aspect of the disclosure provides a vehicle. The vehicle includes a motor for traveling the vehicle, a main power supply, a power converter, a system main relay, a first auxiliary machine, an auxiliary machine battery, a first voltage converter, a second voltage converter, a first power line, a second power line, a third power line, a first diode, and a second diode. The main power supply is configured to store electric power which is supplied to the motor. The power converter is configured to convert electric power of the main power supply into driving power of the motor. The system main relay is configured to connect and disconnect the main power supply and the power converter. The first auxiliary machine is configured to operate with electric power lower than an output voltage of the main power supply. The auxiliary machine battery is configured to output the same voltage as a driving voltage of the first auxiliary machine. The first voltage converter is connected to the main power supply via the system main relay. The first voltage converter is configured to step down the output voltage of the main power supply to the driving voltage of the first auxiliary machine. The second voltage converter is connected to the main power supply without passing through the system main relay. The second voltage converter is configured to step down the output voltage of the main power supply to the driving voltage of the first auxiliary machine. The first power line is connected an output terminal of the first voltage converter with the auxiliary machine battery. The second power line is connected an output terminal of the second voltage converter with the first auxiliary machine. The third power line is connected the auxiliary machine battery with the first auxiliary machine. The first diode is disposed in the third power line. An anode side of the first diode is connected to the auxiliary machine battery and a cathode side of the first diode is connected to the first auxiliary machine. The second diode is disposed in the second power line. An anode side of the second diode is connected to the second voltage converter and a cathode side of the second diode is connected to the first auxiliary machine.

With this configuration, even when the auxiliary machine battery is short-circuited, the first diode prevents a reverse flow of a current and electric power can be continuously supplied to the first auxiliary machine by the second voltage converter. The main power supply and the second voltage converter correspond to backup means for the auxiliary machine battery. According to this configuration, even when the output terminal of the second voltage converter is short-circuited, electric power can be continuously supplied to the first auxiliary machine by the auxiliary machine battery and the first voltage converter.

The vehicle may further include: a fourth power line; a first switch; a short circuit detector; and an electronic control unit. The fourth power line may be connected the anode side of the first diode with the anode side of the second diode. The first switch may be disposed in the fourth power line. The first switch may be configured to cut off the anode side of the first diode and the anode side of the second diode from each other. The short circuit detector may be configured to detect a short circuit of the auxiliary machine battery. The electronic control unit may be configured to open the first switch to cut off the anode side of the first diode and the second diode from each other when the short circuit detector detects the short circuit of the auxiliary machine battery. With this configuration, since the fourth power line is provided, the auxiliary machine battery can be charged using both the first voltage converter and the second voltage converter. When a short circuit of the auxiliary machine battery is detected, electric power can be continuously supplied to the first auxiliary machine by the second voltage converter by turning off the switch.

The vehicle may further include a bypass power line. The bypass power line may be connected the electronic control unit with a high-potential terminal of the capacitor. The electronic control unit may be configured to operate with electric power lower than the output voltage of the main power supply. The first voltage converter may include a capacitor and a third diode. The low-potential terminal of the capacitor may be connected to the ground. An anode side of the third diode may be connected to an output terminal of the first voltage converter, and a cathode side of the third diode may be connected to the high-potential terminal of the capacitor. With this configuration, the capacitor is charged with the output of the first voltage converter. When the auxiliary machine battery is short-circuited, the voltage of the output terminal of the first voltage converter is zero, but the electric power of the capacitor is maintained due to the third diode. The electric power of the capacitor is supplied to the electronic control unit. The electronic control unit can be continuously supplied with electric power even at the moment at which the auxiliary machine battery is short-circuited. The electronic control unit may be the above-mentioned critical auxiliary machine involved in a driving system of the vehicle.

The vehicle may further include a non-critical auxiliary machine and a second switch. The non-critical auxiliary machine may be connected to the third power line. The non-critical auxiliary machine may be configured not to be involved in the driving system of the vehicle. The second switch may be configured to cut off the non-critical auxiliary machine from the third power line. With this configuration, when one of the first voltage converter and the second voltage converter is abnormal and the other functions as a backup power supply, the non-critical auxiliary machine is cut off from the third power line by the second switch. Then, when the vehicle is traveling with the backup power supply, it is possible to suppress extra power supply. Alternatively, when it is intended to decrease the outputs of the first voltage converter and the second voltage converter due to a certain abnormality, it is possible to reduce total power consumption of an auxiliary machine system by cutting off the non-critical auxiliary machine from the third power line.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
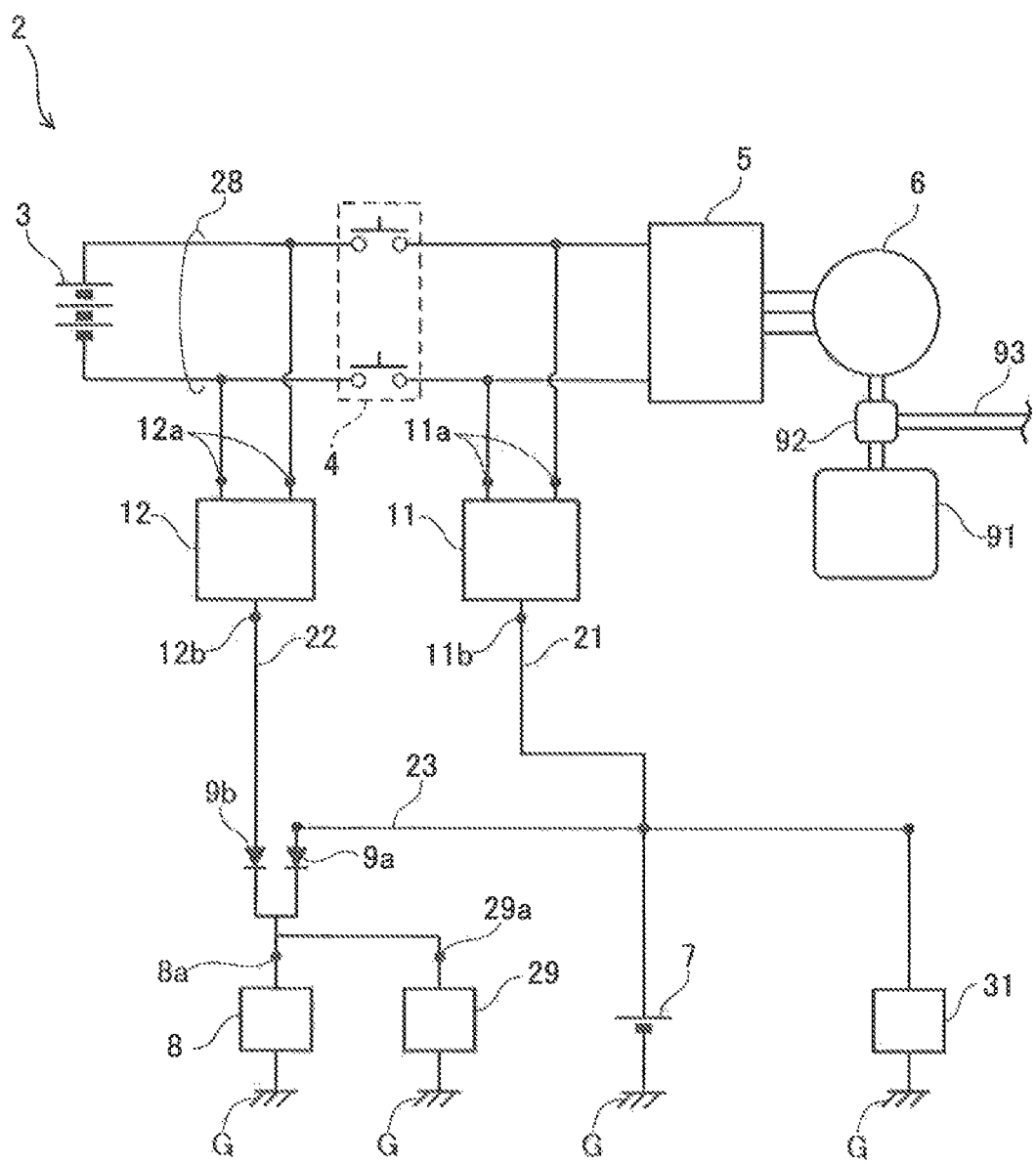
FIG. 1 is a block diagram of a power system of a vehicle according to a first embodiment.

A vehicle according to a first embodiment will be described below with reference to FIG. 1. The vehicle according to the first embodiment is a hybrid vehicle 2 including a motor 6 and an engine 91 which generate driving torques for traveling. An output shaft of the motor 6 and an output shaft of the engine 91 are connected to a transmission 92. The driving torque of the motor 6 and the driving torque of the engine 91 are combined by the transmission 92 and are transmitted to an axle 93. The transmission 92 can split the driving torque of the engine 91 to the motor 6 and the axle 93. In this case, the hybrid vehicle 2 travels using a part of the driving torque of the engine 91 and generates electric power by driving the motor 6 reversely using the remaining part of the driving torque. The electric power acquired by the generation of electric power is stored in a main battery 3 which will be described later. When a driver depresses a brake pedal, the motor 6 generates electric power using kinetic energy of the vehicle.

The motor 6 is driven with electric power of the main battery 3. An output voltage of the main battery 3 is, for example, 300 volts. The motor 6 is a three-phase AC electric motor and a driving voltage thereof is, for example, 600 volts. A power converter 5 steps up a voltage of DC power of the main battery 3 and converts the DC power into AC power which is suitable for driving of the motor 6. When the motor 6 generates electric power, the power converter 5 converts AC power output from the motor 6 into DC power and then steps down the DC power to the output voltage of the main battery 3.

The main battery 3 and the power converter 5 are connected to a main power line 28. A system main relay 4 is connected to the middle of the main power line 28. When a main switch of the vehicle is turned on, the system main relay 4 is closed by a system controller which is not illustrated, and the main battery 3 and the power converter 5 are electrically connected to each other. Close a relay (close a switch) means that both ends of the relay (both ends of the switch) are electrically connected to each other. The expression close a relay (close a switch) may be expressed by turn on the relay (turn on the switch). On the other hand, open a relay (open a switch) means that both ends of the relay (both ends of the switch) are electrically disconnected from each other. The expression open a relay (open a switch) may be expressed by turn off the relay (turn off the switch).

The system controller is supplied with electric power from an auxiliary machine battery which will be described later, and can operate even when the system main relay 4 is opened. When the main switch of the vehicle is turned off, the system controller opens the system main relay 4, and the main battery 3 and the power converter 5 are electrically isolated from each other.

The hybrid vehicle 2 includes a group of auxiliary machines which operate with a voltage lower than the output voltage of the main battery 3 in addition to the motor 6 which operates with the output voltage of the main battery 3. An auxiliary machine group can be sorted into two types of critical auxiliary machines which are critical devices involved in traveling of the vehicle and which are required not to stop during traveling and non-critical auxiliary machines which are not involved in traveling of the vehicle. Examples of the critical auxiliary machine include a shift-by-wire system 8 and a system controller 29. Examples of the non-critical auxiliary machine include an audio device 31. Although not illustrated, some critical auxiliary machines are provided in addition to the shift-by-wire system 8 and the system controller 29, and various non-critical auxiliary machines are provided in addition to the audio device 31. In this embodiment, the shift-by-wire system 8 and the system controller 29 are representative examples of the critical auxiliary machine, and the audio device 31 is a representative example of the non-critical auxiliary machine.

The hybrid vehicle 2 further includes an auxiliary machine battery 7, a first voltage converter 11, a second voltage converter 12, a first diode 9a, and a second diode 9b.

The first voltage converter 11 and the second voltage converter 12 are converters that step down the output voltage of the main battery 3 to a driving voltage of an auxiliary machine. An input terminal 11a of the first voltage converter 11 is connected to the main battery 3 via the system main relay 4. An output terminal 11b of the first voltage converter 11 is connected to a positive electrode of the auxiliary machine battery 7 via a first power line 21. A negative electrode of the auxiliary machine battery 7 is connected to the ground G. The shift-by-wire system 8, the system controller 29, the audio device 31, and the negative electrode auxiliary machine battery 7 are connected to the ground G. The ground G is a conductive body of the vehicle.

An input terminal 12a of the second voltage converter 12 is connected to the main battery 3 without passing through the system main relay 4. An output terminal 12b of the second voltage converter 12 is connected to a power input terminal 8a of the shift-by-wire system 8 and a power input terminal 29a of the system controller 29 via the second power line 22. The power input terminal 8a of the shift-by-wire system 8 and the power input terminal 29a of the system controller 29 are connected to a positive electrode of the auxiliary machine battery 7 via a third power line 23. The auxiliary machine battery 7 is connected to the audio device 31 via the third power line 23.

The auxiliary machine battery 7 is a battery for supplying electric power to an auxiliary machine group including the shift-by-wire system 8, the system controller 29, and the audio device 31 and an output voltage thereof is, for example, 12 volts. The output voltage of the auxiliary machine battery 7 is the same as the driving voltage of the shift-by-wire system 8, the system controller 29, and the audio device 31.

The first diode 9a is connected to the third power line 23. An anode of the first diode 9a is connected to a side of the auxiliary machine battery 7 and a cathode thereof is connected to sides of the shift-by-wire system 8 and the system controller 29. The first diode 9a is provided to prevent a reverse flow of a current from the shift-by-wire system 8 or the system controller 29 to the auxiliary machine battery 7. The second diode 9b is connected to a second power line 22. An anode of the second diode 9b is connected to the second voltage converter 12 and a cathode thereof is connected to the shift-by-wire system 8 and the system controller 29. The second diode 9b is provided to prevent a reverse flow of a current from the shift-by-wire system 8 or the system controller 29 to the second voltage converter 12.

The shift-by-wire system 8 and the system controller 29 are devices required for driving the hybrid vehicle 2 (devices involved in a driving system) and preferably operate continuously even when the auxiliary machine battery 7 is short-circuited. The shift-by-wire system 8 and the system controller 29 can be supplied with electric power from the auxiliary machine battery 7 and can also be directly supplied with electric power from the main battery 3 via the second voltage converter 12. The first diode 9a for prevention of a reverse flow of a current is disposed in the third power line 23 which connects the positive electrode of the auxiliary machine battery 7 and the power input terminals 8a and 29a of the auxiliary machines (the shift-by-wire system 8 and the system controller 29). Accordingly, even when the auxiliary machine battery 7 is short-circuited, a current does not flow reversely from the shift-by-wire system 8 and the system controller 29 to the auxiliary machine battery 7, and the shift-by-wire system 8 and the system controller 29 can be supplied with electric power from the main battery 3 and can operate continuously.

The second diode 9b for prevention of a reverse flow of a current is also disposed in the second power line 22 which connects the output terminal 12b of the second voltage converter 12 and the power input terminals 8a and 29a of the auxiliary machines (the shift-by-wire system 8 and the system controller 29). Even when the output terminal 12b of the second voltage converter 12 is short-circuited, a current does not flow reversely from the shift-by-wire system 8 or the system controller 29 to the second voltage converter 12, and the shift-by-wire system 8 and the system controller 29 can be supplied with electric power from the auxiliary machine battery 7 and can operate continuously.

When a short circuit is generated closer to the main battery 3 than the system main relay 4, the system controller 29 opens the system main relay 4 to isolate the first voltage converter 11 and the power converter 5 from the main battery 3. In this case, the hybrid vehicle 2 can charge the auxiliary machine battery 7 with regenerative power (electric power acquired through power generation of the motor 6) using the power converter 5 and the first voltage converter 11. The shift-by-wire system 8 and the system controller 29 can be supplied with electric power from the auxiliary machine battery 7 and can operate continuously. When a short circuit is generated closer to the power converter 5 than the system main relay 4, the system controller 29 opens the system main relay 4 to isolate the main battery 3 from the power converter 5 and the first voltage converter 11. In this case, the second voltage converter 12 steps down the output power of the main battery 3 and can supply the stepped-down power to the shift-by-wire system 8 and the system controller 29. The system controller 29 includes the capacitor as a backup power supply and thus can operate continuously even when supply of electric power is temporarily stopped.

Even when a short circuit is generated close to the input terminal 11a or the output terminal 11b of the first voltage converter 11, the system controller 29 continuously sends a command to the first voltage converter 11. This is because when the input terminal 11a or the output terminal 11b of the first voltage converter 11 is short-circuited, the first voltage converter 11 does not actually operate in spite of reception of the command. Similarly, even when a short circuit is generated close to the input terminal 12a or the output terminal 12b of the second voltage converter 12, the system controller 29 continuously sends a command to the second voltage converter 12. In this case, the second voltage converter 12 does not actually operate in spite of reception of the command.

Figure 2:
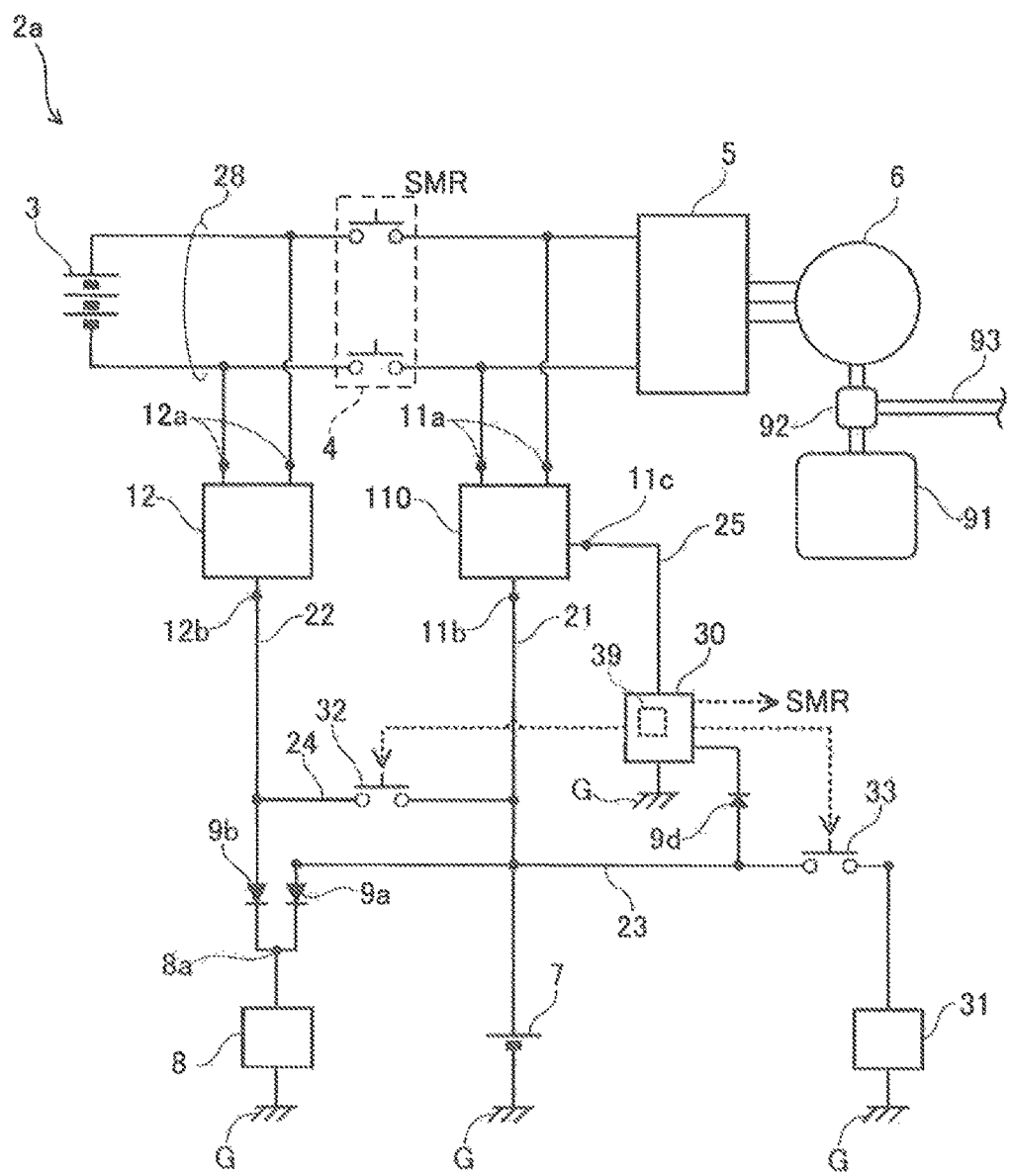
FIG. 2 is a block diagram of a power system of a vehicle according to a second embodiment.

A vehicle according to a second embodiment will be described below with reference to FIG. 2. The vehicle according to the second embodiment is a hybrid vehicle 2a. The hybrid vehicle 2a includes a fourth power line 24, a bypass power line 25, a first switch 32, a second switch 33, and a fourth diode 9d in addition to the configuration of the hybrid vehicle 2 illustrated in FIG. 1. A third diode 9c is disposed in a first voltage converter 110 and will be described later. The first voltage converter 110 of the hybrid vehicle 2a includes a second output terminal 11c, unlike the first voltage converter 11 of the hybrid vehicle 2 according to the first embodiment. In FIG. 2, a system controller 30 is connected to the third power line 23 and the bypass power line 25. In FIG. 2, a dotted arrow denotes a signal line. A solid line denotes a power line. SMR in FIG. 2 denotes a system main relay. Elements described above with reference to FIG. 1 will not be described again.

The first voltage converter 110 includes two output terminals (the first output terminal 11b and the second output terminal 11c). The first output terminal 11b is the same as the output terminal 11b of the first voltage converter 11 illustrated in FIG. 1. The first voltage converter 110 steps down a voltage applied to the input terminal 11a to the output voltage of the auxiliary machine battery 7 and outputs the stepped-down voltage to the first output terminal 11b and the second output terminal 11c. The second output terminal 11c is different from the first output terminal 11b in that a diode (the third diode 9c) is disposed between the second output terminal and a main conversion circuit that converts electric power in the first voltage converter 110. This will be described later with reference to FIG. 3.

The system controller 30 is supplied with electric power from the auxiliary machine battery 7 via the third power line 23 and is supplied with electric power from the first voltage converter 110 via the bypass power line 25. The fourth diode 9d that prevents a reverse flow of a current from the system controller 30 to the auxiliary machine battery 7 is connected to the third power line 23. The system controller 30 and the second output terminal 11c of the first voltage converter 110 are connected to each other via the bypass power line 25. As described above, the system controller 30 controls the system main relay 4. The system controller 30 also controls the first switch 32 and the second switch 33.

The first switch 32 is included in the fourth power line 24 that connects the anode side of the first diode 9a and the anode side of the second diode 9b. The first switch 32 can electrically isolate the anode side of the first diode 9a and the anode side of the second diode 9b from each other. The second switch 33 is connected between the third power line 23 and the audio device 31. The second switch 33 can electrically isolate the audio device 31 and the third power line 23 from each other.

The system controller 30 closes the first switch 32 when neither the first power line 21 (the auxiliary machine battery 7) nor the second power line 22 is short-circuited. By closing the first switch 32, the auxiliary machine battery 7 can be charged via the second voltage converter 12 in addition to the first voltage converter 110. Accordingly, it is possible to reduce a load of the first voltage converter 110 at the time of charging the auxiliary machine battery 7.

When the first power line 21 (the auxiliary machine battery 7) is short-circuited, the system controller 30 opens the first switch 32 to isolate the second voltage converter 12 from the auxiliary machine battery 7. Accordingly, electric power can be continuously supplied to the shift-by-wire system 8 via the second voltage converter 12. That is, even when the auxiliary machine battery 7 is short-circuited, the shift-by-wire system 8 can operate continuously. Even when the first power line 21 is short-circuited, a reverse flow of a current from the shift-by-wire system 8 to the auxiliary machine battery 7 is prevented by the first diode 9a for prevention of a reverse flow of a current.

The system controller 30 is connected to the auxiliary machine battery 7 via the third power line 23. However, since the third power line 23 includes the fourth diode 9d for prevention of a reverse flow of a current, no current flows from the system controller 30 to the auxiliary machine battery 7 when the auxiliary machine battery 7 is short-circuited. When the auxiliary machine battery 7 is short-circuited, the system controller 30 can be continuously supplied with electric power from the first voltage converter 110 via the bypass power line 25 so as to operate continuously.

When a short circuit is generated in the audio device 31, the system controller 30 opens the second switch 33 to isolate the audio device 31 from the auxiliary machine battery 7. Accordingly, it is possible to prevent the auxiliary machine battery 7 from being short-circuited and to continuously supply electric power from the auxiliary machine battery 7 to other auxiliary machines (the system controller 30 and the shift-by-wire system 8).

Figure 3:
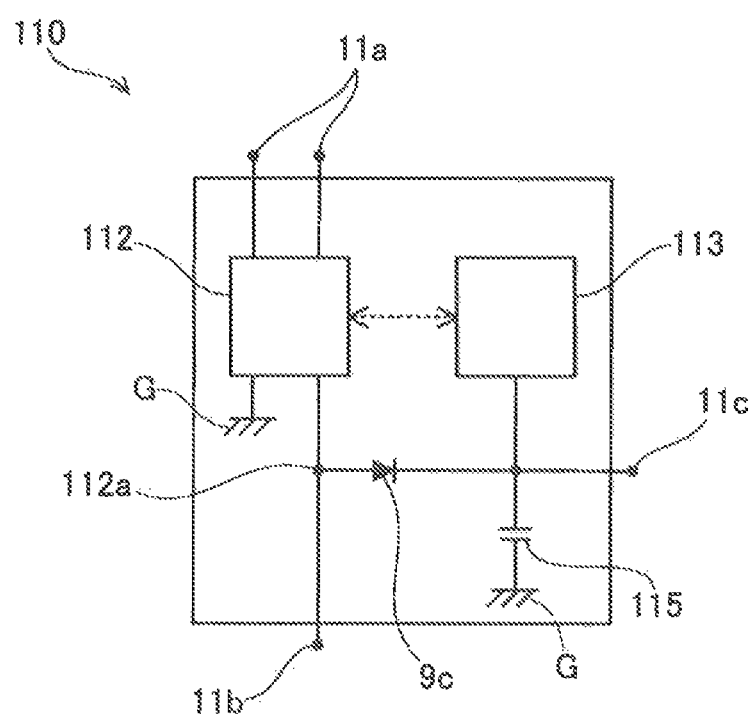
FIG. 3 is a diagram illustrating a circuit configuration of a first voltage converter according to the second embodiment.

A circuit configuration of the first voltage converter 110 will be described below with reference to FIG. 3. FIG. 3 is a diagram illustrating the circuit configuration of the first voltage converter 110. The first voltage converter 110 includes a main conversion circuit 112 including a power transistor, a control circuit 113 that controls the power transistor of the main conversion circuit 112, a third diode 9c, and a capacitor 115. The main conversion circuit 112 steps down a voltage of the electric power of the main battery 3 input to the input terminal 11a and outputs the stepped-down voltage to the first output terminal 11b and the second output terminal 11c. A negative output terminal of the main conversion circuit 112 is connected to the ground G. The third diode 9c is connected between the positive output terminal 112a of the main conversion circuit 112 and the second output terminal 11c. As illustrated in FIG. 2, the first output terminal 11b of the first voltage converter 110 is connected to the auxiliary machine battery 7 via the first power line 21, and the second output terminal 11c is connected to the system controller 30 via the bypass power line 25. When the auxiliary machine battery 7 is short-circuited, the first output terminal 11b of the first voltage converter 110 is also short-circuited. The third diode 9c permits a flow of a current from the positive output terminal 112a of the main conversion circuit 112 to the second output terminal 110 but prohibits a reverse flow of a current. The third diode 9c prevents a reverse flow of a current from the system controller 30 to the auxiliary machine battery 7 via the bypass power line 25 and the first power line 21 when the first output terminal 11b is short-circuited.

A high-potential terminal of the capacitor 115 and the control circuit 113 are connected to the cathode side of the third diode 9c for prevention of a reverse flow of a current. A low-potential terminal of the capacitor 115 is grounded. Although not illustrated, the control circuit 113 is supplied with electric power from the auxiliary machine battery 7 via the third power line 23. Before the third power line 23 is short-circuited, the control circuit 113 operates with electric power supplied from the auxiliary machine battery 7 via the third power line 23. At this time, the capacitor 115 is charged. Another diode for prevention of a reverse flow of a current from the control circuit 113 to the third power line 23 is connected between the control circuit 113 and the third power line 23. Accordingly, when the auxiliary machine battery 7 is short-circuited, a current does not flow reversely from the control circuit 113 to the auxiliary machine battery 7 via the third power line 23.

The high-potential terminal of the capacitor 115 is connected to the cathode side of the third diode 9c. Accordingly, even when the first output terminal 11b is short-circuited, a current does not flow reversely from the capacitor 115 to the side of the first output terminal 11b. The capacitor 115 stores electric power before the auxiliary machine battery 7 is short-circuited. For example, when the audio device 31 is short-circuited, the third power line 23 is short-circuited, the auxiliary machine battery 7 is also short-circuited, and the voltage of the first output terminal 11b (and the positive output terminal 112a of the main conversion circuit 112) decreases to zero volts. At this time, a reverse flow of a current from the capacitor 115 to the side of the first output terminal 11b is prevented by the third diode 9c. Electric power is supplied to the control circuit 113 from the capacitor 115. The second output terminal 11c is connected to the system controller 30 via the bypass power line 25. When the audio device 31 (the third power line 23) is short-circuited and the voltage of the first output terminal 11b (and the positive output terminal 112a of the main conversion circuit 112) decreases to zero volts, electric power is supplied to the system controller 30 from the capacitor 115. Even when the audio device 31 (the third power line 23) is short-circuited, the system controller 30 can operate continuously. The connection relationship between the third diode 9c and the capacitor 115 can be summarized as follows. The first voltage converter 110 includes the capacitor 115 and the third diode 9c. The anode of the third diode 9c is connected to the positive output terminal 112a (that is, the output terminal 11b of the first voltage converter 110). The cathode of the third diode 9c is connected to the high-potential terminal of the capacitor 115. The low-potential terminal of the capacitor 115 is grounded. The high-potential terminal of the capacitor 115 is connected to the power input terminal of the system controller 30 via the bypass power line 25.

When it is detected that the audio device 31 is short-circuited, the system controller 30 opens the second switch 33. When the second switch 33 is opened, the short-circuited state of the first output terminal 11b (and the positive output terminal 112a of the main conversion circuit 112) is released. Then, supply of electric power from the auxiliary machine battery 7 to the shift-by-wire system 8 and the system controller 30 via the third power line 23 is restarted.

The system controller 30 includes a short circuit detector 39 that detects a short circuit of the third power line 23, that is, a short circuit of the auxiliary machine battery 7. The short circuit detector 39 monitors a current or a voltage of the third power line 23. The short circuit detector 39 detects that the third power line 23 is short-circuited, for example, when supply of electric power via the third power line 23 is cut off. Alternatively, the short circuit detector 39 may be connected to a voltage sensor (not illustrated) that measures a voltage of the third power line 23, and may detect a short circuit of the third power line 23 (the auxiliary machine battery 7) when the measured value of the voltage sensor is 0. The short circuit detector 39 may be connected to a current sensor (not illustrated) that measures a current flowing in the third power line 23 and may determine that a short-circuit has been generated in the third power line 23 (the auxiliary machine battery 7) when an overcurrent is detected by the current sensor.

The system controller 30 turns on a warning lamp that notifies of occurrence of an abnormality in one of the following three cases: (1) a case in which a short circuit of the third power line 23 (a short circuit of the auxiliary machine battery 7) is detected by the short circuit detector 39; (2) a case in which a short circuit of the main battery side of the system main relay 4 is detected; and (3) a case in which a short circuit of the power converter side of the system main relay 4 is detected. The hybrid vehicle 2a can allow the shift-by-wire system 8 and the system controller 30 to operate continuously even when the short circuit is generated. Accordingly, the hybrid vehicle can transition to a special traveling mode at the time of occurrence of an abnormality (a saving traveling mode) to travel continuously, in which the vehicle stops the motor 6 and travels using only the engine 91.

The second switch 33 has another function. The second switch 33 isolates a non-critical auxiliary machine, which is not involved in the driving system of the vehicle, from the third power line 23. Accordingly, when it is intended to minimize consumption of the auxiliary machine battery due to a certain factor or it is intended to minimize output power of the first voltage converter 110 and the second voltage converter 12, it is possible to minimize power consumption by the non-critical auxiliary machine not involved in the driving system by opening the second switch 33.

Figure 4:
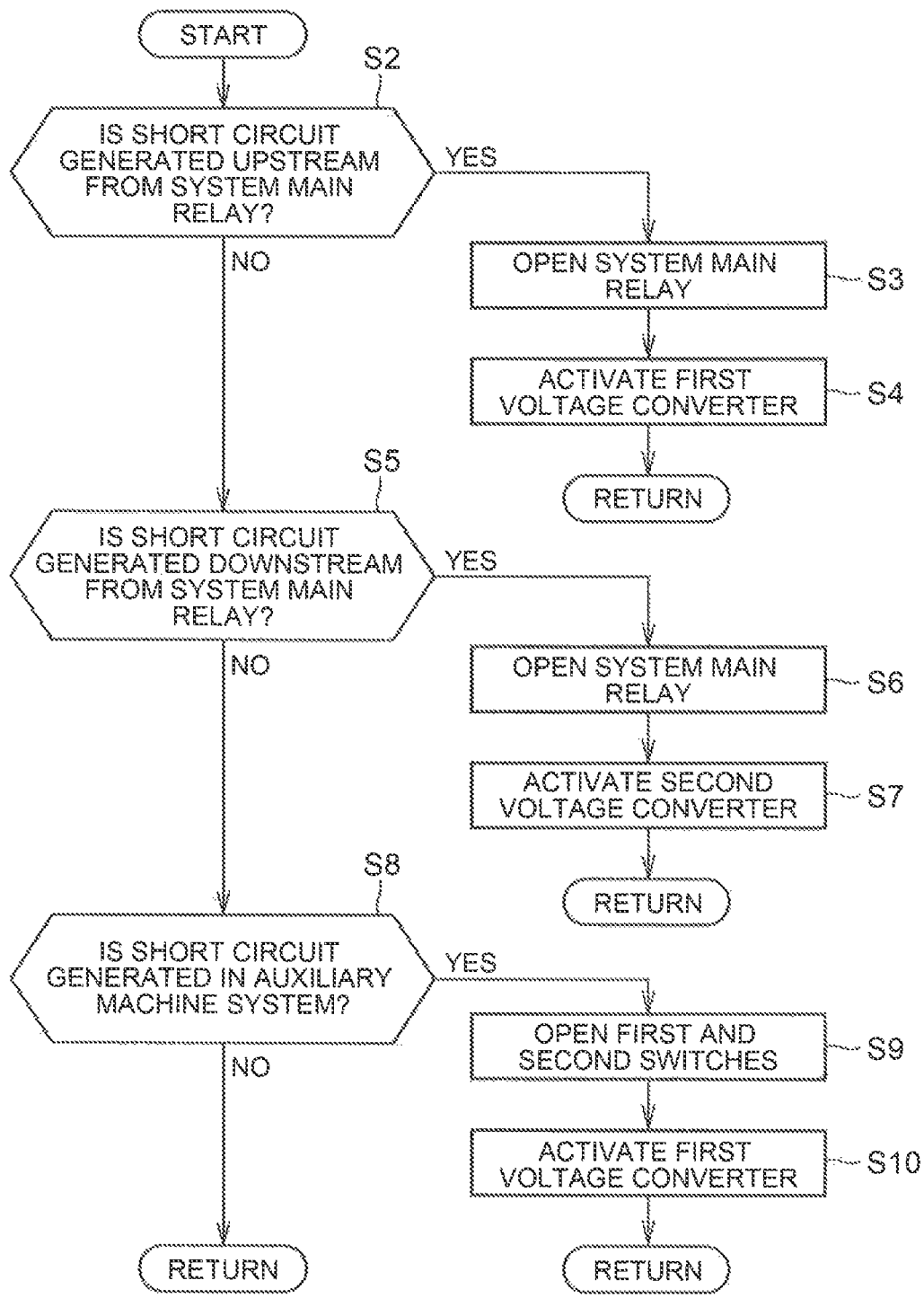
FIG. 4 is a flowchart illustrating a routine which is performed by a system controller.

FIG. 4 is a flowchart illustrating a routine which is performed by the system controller 30. The routine illustrated in FIG. 4 is periodically performed by the system controller 30. When a short circuit is generated upstream from the system main relay 4, that is, in the main battery 3 or between the main battery 3 and the system main relay 4 (YES in S2), the system controller 30 opens the system main relay 4 (S3) and activates the first voltage converter 110 to supply electric power to the third power line 23 (S4). As described above, regenerative power in this case serves as electric power which is supplied to the first voltage converter 110.

When a short circuit is not generated upstream from the system main relay 4 (NO in S2), the system controller 30 checks whether a short circuit is generated downstream from the system main relay 4 (S5). The downstream side of the system main relay 4 is between the system main relay 4 and the power converter 5 or between the system main relay 4 and the first voltage converter 110. When a short circuit is generated downstream from the system main relay 4 (YES in S5), the system controller 30 opens the system main relay 4 (S6) and activates the second voltage converter 12 to supply electric power to the shift-by-wire system 8 and the third power line 23 (S7). The second voltage converter 12 steps down the voltage of the main battery 3 and supplies electric power to the shift-by-wire system 8 and the third power line 23. At this time, the first switch 32 is closed, and electric power is supplied from the second voltage converter 12 to the third power line 23 via the fourth power line 24.

When a short circuit is not generated downstream from the system main relay 4 (NO in S5), the system controller 30 checks whether a short circuit is generated in an auxiliary machine system (S8). When a short circuit is generated in the auxiliary machine system (YES in S8), the system controller 30 opens the first switch 32 and the second switch 33 to isolate the audio device 31 and the second voltage converter 12 from the first voltage converter 110 (S9). Here, the short-circuit of the auxiliary machine system refers to a short circuit of the second power line 22. The short-circuited second power line 22 can be isolated from the first power line 21 by opening the first switch 32.

Then, the system controller 30 activates the first voltage converter 110 (S10). Electric power is continuously supplied to the shift-by-wire system 8 and the system controller 30 by the process of Step S10. Accordingly, the hybrid vehicle 2a can travel continuously. At this time, since the audio device 31 is isolated from the third power line 23, the output of the first voltage converter 110 is not necessarily used for the auxiliary machine (the audio device 31) which is not involved in the driving system.

Points to remember in the technology described in the embodiments will be described below. The main battery 3 in the embodiments is an example of the main power supply in the SUMMARY. The main power supply may be a fuel cell. The shift-by-wire system 8 and the system controller 29 in the embodiments are an example of the first auxiliary machine in the SUMMARY. The first diode 9a in the embodiments is an example of the first diode in the SUMMARY, and the second diode 9b in the embodiments is an example of the second diode in the SUMMARY. The system controller 30 in the second embodiment is an example of the electronic control unit in the SUMMARY. The third diode 9c in the second embodiment is an example of the third diode in the SUMMARY. The audio device 31 in the second embodiment is an example of the non-critical auxiliary machine in the SUMMARY.

The shift-by-wire system 8 and the system controllers 29 and 30 in the embodiments are examples of the critical auxiliary machine involved in the driving system. The critical auxiliary machine involved in the driving system is not limited to these units. For example, a cruise control device is a critical auxiliary machine involved in the driving system. The audio device 31 is an example of a non-critical auxiliary machine not involved in the driving system. A room lamp and a cigarette lighter port are non-critical auxiliary machines not involved in the driving system.

The technology disclosed in the disclosure may be applied to an electric vehicle not including an engine.

While specific examples of the disclosure have been described above in detail, the specific examples are only exemplary and do not limit the appended claims. The techniques described in the claims include various modifications and changes of the above-mentioned specific examples. Technical elements described or illustrated in the specification or the drawings exhibit technical usability alone or in combination and are not limited to combinations described in the claims at the time of filing of the disclosure. The techniques described or illustrated in the specification or the drawings can simultaneously achieve two or more objects and have technical usability by achieving one object thereof.

What is claimed is:

1. A vehicle comprising:
a motor for traveling the vehicle;
a main power supply configured to store electric power that is supplied to the motor;
a power converter configured to convert electric power of the main power supply into driving power of the motor;
a system main relay configured to connect and disconnect the main power supply with the power converter;
a first auxiliary machine configured to operate with electric power lower than an output voltage of the main power supply;
an auxiliary machine battery configured to output the same voltage as a driving voltage of the first auxiliary machine;
a first voltage converter connected to the main power supply via the system main relay, the first voltage converter being configured to step down the output voltage of the main power supply to the driving voltage of the first auxiliary machine;
a second voltage converter connected to the main power supply without passing through the system main relay, the second voltage converter being configured to step down the output voltage of the main power supply to the driving voltage of the first auxiliary machine;
a first power line connecting an output terminal of the first voltage converter with the auxiliary machine battery;
a second power line connecting an output terminal of the second voltage converter with the first auxiliary machine;
a third power line connecting the auxiliary machine battery with the first auxiliary machine;
a first diode disposed in the third power line, an anode side of the first diode being connected to the auxiliary machine battery and a cathode side of the first diode being connected to the first auxiliary machine; and
a second diode disposed in the second power line, an anode side of the second diode being connected to the second voltage converter and a cathode side of the second diode being connected to the first auxiliary machine.

2. The vehicle according to claim 1, further comprising:
a fourth power line connecting the anode side of the first diode with the anode side of the second diode;
a first switch disposed in the fourth power line, the first switch being configured to cut off the anode side of the first diode and the anode side of the second diode from each other;
a short circuit detector configured to detect a short circuit of the auxiliary machine battery; and
an electronic control unit configured to open the first switch to cut off the anode side of the first diode and the anode side of the second diode from each other when the short circuit detector detects the short circuit of the auxiliary machine battery.

3. The vehicle according to claim 1, further comprising:
a bypass power line connecting an electronic control unit with a high-potential terminal of capacitor,
wherein the electronic control unit is configured to operate with electric power lower than the output voltage of the main power supply, and
the first voltage converter includes the capacitor and a third diode,
a low-potential terminal of the capacitor is connected to a ground, an anode side of the third diode is connected to the output terminal of the first voltage converter, and a cathode side of the third diode is connected to the high-potential terminal of the capacitor.

4. The vehicle according to claim 1, further comprising:
a non-critical auxiliary machine connected to the third power line, the non-critical auxiliary machine being configured not to be involved in a driving system of the vehicle; and
a switch configured to cut off the non-critical auxiliary machine from the third power line.

* * * * *